Sept. 22, 1936.   B. C. PLACE   2,055,047
SECURING HUB CAPS
Filed Oct. 1, 1932    2 Sheets-Sheet 1
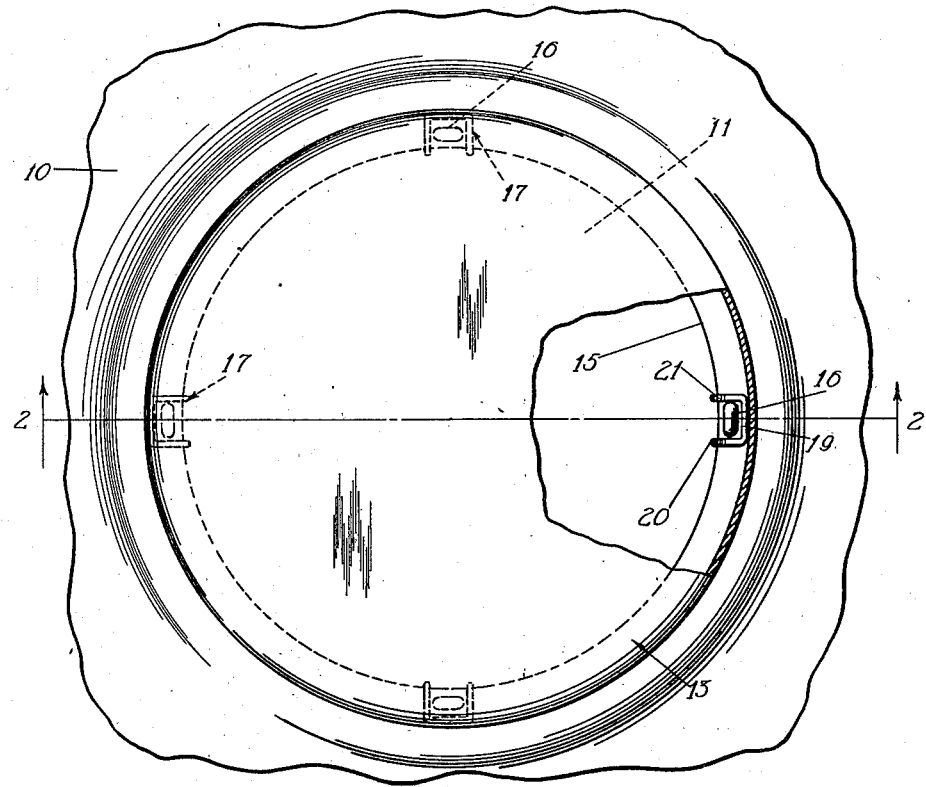
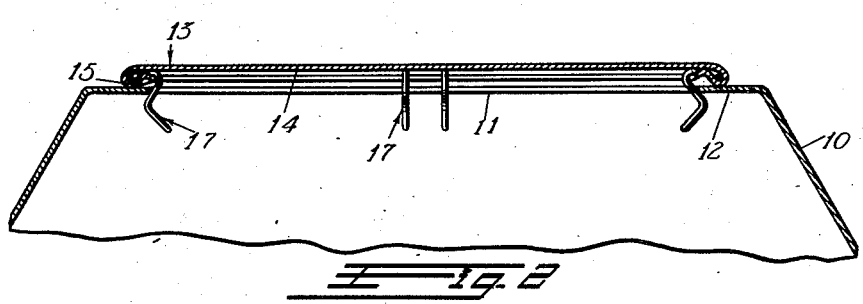
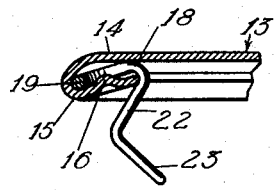 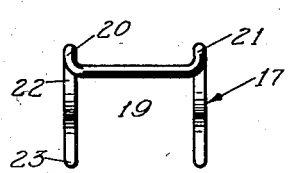
Inventor
Bion C. Place Sept. 22, 1936.  B. C. PLACE  2,055,047
SECURING HUB CAPS
Filed Oct. 1, 1932   2 Sheets-Sheet 2
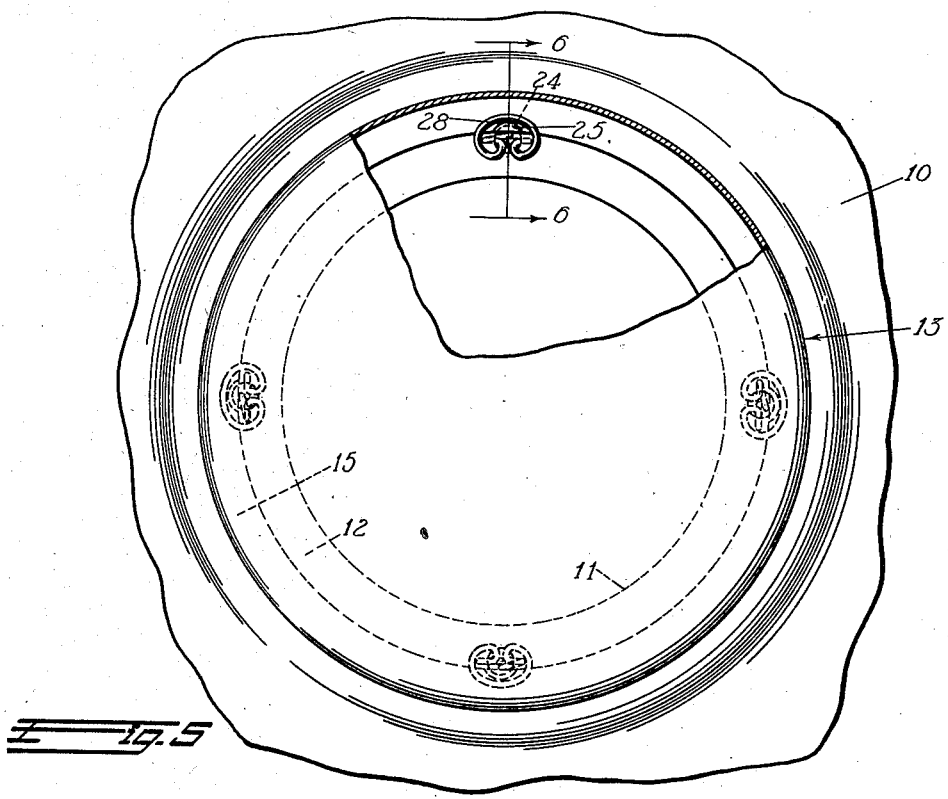
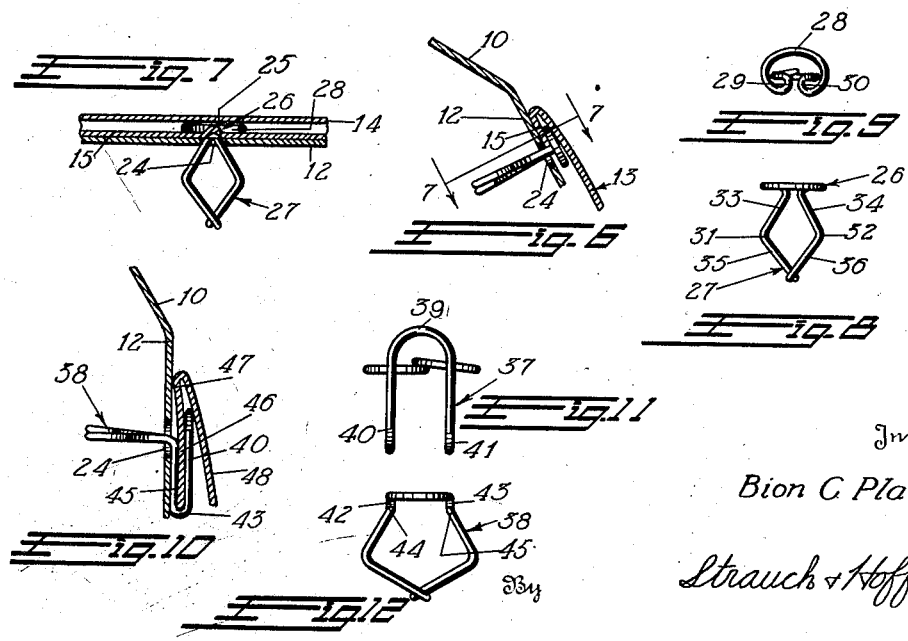
Inventor
Bion C Place
Strauch & Hoffman
Attorneys

UNITED STATES PATENT OFFICE 2,055,047

SECURING HUB CAPS

Bion C. Place, Detroit, Mich., assignor of one-half to George E. Gagnier, Detroit, Mich.

Application October 1, 1932, Serial No. 635,826

5 Claims. (Cl. 301—108)

This invention relates to a method and arrangement for securing hub caps, particularly to metallic wheels of the kind that include a metallic wheel hub formed to provide an axial opening that is surrounded by a flange of the metal from which the hub is formed.

The primary purpose of the present invention is to provide a greatly simplified hub cap construction by utilizing separate spring fasteners of a very simple type and interlocking said fasteners with respect to the hub cap, the fasteners alone being provided with the resilience and stiffness necessary to hold the hub cap firmly in contact with the hub, so that the cap itself may be constructed of material that is capable of being embossed when desired.

Another object of the invention is to provide a one-piece hub cap, and to interlock spring fasteners to the cap by bringing a part of the cap into interlocking relation to a part of the fastener.

Still another object of the invention is to provide a hub cap with an inwardly turned flange spaced from the body of the cap sufficiently to permit the passage of a part of each of a plurality of spring fasteners between the body and the flange and to strike bosses or lugs from the cap to maintain the fasteners in proper position between said flange and the body.

Another object of the invention is to provide a hub cap ready for attachment to the metallic hub of a wheel which includes the cap proper and a plurality of separate spring snap fasteners that are interlocked with respect to the cap by a relatively slight deformation of a part thereof, and which fasteners each include a pair of spring arms that are designed to be readily brought into holding engagement with said hub of the wheel.

Still another object of the invention is to provide an arrangement for securing hub caps to wheels in which use is made of a spring fastener designed to exert a continuously effective yielding pressure holding the cap snugly in contact with the hub.

Still another object of the invention is to provide an arrangement for securing hub caps or the like upon their supporting structure by means of snap fasteners constructed of a single piece of wire bent into appropriate form and provided with the necessary stiffness and resilience to hold the cap firmly in place in spite of the ease with which said fasteners may be assembled with respect to the cap and with respect to said supporting structure.

Further objects of the invention will appear as a description thereof proceeds with reference to the accompanying drawings in which:

Figure 1 is an elevation of a hub cap constructed in accordance with the present invention and secured to a hub of a wheel by one type of fastener, a part of the cap being broken away to disclose the mode of fastening the cap in place.

Figure 2 is a cross-sectional view taken on the plane indicated by the line 2—2 in Figure 1.

Figure 3 is a sectional view of a fragment of a hub cap constructed in accordance with the present invention, showing the mode of interlocking the fastener with respect to the cap on an enlarged scale.

Figure 4 is an elevational view of the fastener shown in Figure 3, looking along the head thereof from the part that connects its spring arms.

Figure 5 is a view similar to Figure 1 showing a modified way of attaching the cap.

Figure 6 is a fragmentary sectional view taken on the plane indicated by the line 6—6 in Figure 5.

Figure 7 is a sectional view taken on the plane indicated by the line 7—7 in Figure 6.

Figures 8 and 9 are respectively side and top views of the fastener utilized to secure the cap illustrated in Figures 5, 6 and 7.

Figure 10 is a sectional view similar to Figure 6, showing a further modified form of fastener for securing the cap in position and a slightly modified form of cap.

Figures 11 and 12 are respectively top and side views of the fastener included in the arrangement illustrated in Figure 10.

Like reference characters indicate like parts throughout the several figures.

The present invention is particularly concerned with the attachment of sheet-metallic or like hub caps to a metallic wheel hub designated by the numeral 10, which hub is provided with an axial opening 11, that is surrounded by a flange 12 of the metal from which the hub is formed. The cap 13 is preferably constructed of light sheet metal of a character capable of being embossed. The body 14 of said cap may be constructed in any desired form, providing the desired appearance. While a flat cap has been illustrated, it should be understood that the body 14 may assume any form providing the desired ornamentation.

The cap 13 is constructed of a size sufficient to lap the opening 11 in the hub and the edges of the blank of sheet metal, from which the cap is formed, are turned inwardly providing a cap flange 15 that is spaced from the body of the cap a sufficient distance to permit the head of a fastener presently to be described to be passed between said flange and body. At intervals the flange 15 is provided with bosses 16 formed by pressing parts of the flange 15 toward the body 14. Such bosses are formed at the points at which fasteners are to be applied to the caps. While four such projections have been illustrated, it should be understood that any greater or smaller number may be employed.

The cap structure, it will be observed, constitutes a unitary structure which may be made of light sheet metal, since the cap serves the sole function of closing the axial opening 11 in the hub of the wheel. By this invention, a cap such as just described may be firmly detachably secured in position upon the hub of the wheel by means of separate fasteners 17. Each fastener 17 is constructed from a single piece of wire bent into the form illustrated and preferably tempered after it has been so bent to give the wire the necessary stiffness and resilience. The fastener 17 comprises a head part 18 formed from the mid-portion of the wire by bending said portions into the form of a U, comprising a cross portion 19 and connecting arms 20 and 21 extending approximately at right angles to the cross portion 19. The ends of the wire from which the fastener is formed are each bent approximately as illustrated in the drawings to provide on each leg a portion 22 that forms an acute angle with the arm with which it is connected, and a portion 23 arranged at an obtuse angle to portion 22.

The fasteners just described may be brought into interlocked relation with respect to the cover 13 in an extremely simple manner by entering the head between the flange 15 and the body of the cap and snapping the cross part 19 of the head of the fastener past the boss or projection 16, the inherent resilience of the cap permitting this to be readily accomplished. Preferably the flange 15 is inclined upwardly toward the body of the cap so as to provide a line contact between the cap and the flange 12 of the hub on which the cap rests. The bosses 16 are preferably formed of a length that corresponds to the spacing of the arms 20 and 21 of the head of the fastener so that after the cross part 19 has been snapped past the boss 16 the arms 20 and 21 rest upon the flange of the cap, relatively close to the ends of the boss whereby the fastener is held from movement along the flange after the cross part has been snapped past the boss, the cross parts preferably lying in the angle formed between the body 14 and the flange 15. The necessary fasteners are assembled with respect to the cap in the manner just stated, and the cap and fastener assembly is then ready for application to the hub of the wheel.

In applying the assembly of cap and fasteners to the hub of the wheel it is simply necessary to exert pressure against the cap in the direction of the axis of the opening in the hub. The fasteners are so formed that when the cap is brought toward the opening 11 the portions 23 contact with the outer corners of the flange 12. As pressure is exerted against the cap the inclined surfaces on said portions serve to wedge the legs of the fastener toward the axis of the opening permitting said legs to pass through the opening bounded by the flange 12. After said legs have been passed through the openings their own resilience causes them to move toward their normal or natural position so that the inclined surfaces of the portions 22 bear against the inner corners of the flange 12, retaining the cap firmly in position. Inasmuch as the inclined surfaces of the portions 22 are arranged so as to provide a relatively sharp angle with respect to the flange 12, said arms exert a wedging action against the inner corner of said flange, tending to draw the cap into firm contact with the outer surface of the flange 12. Since the fasteners are so formed that the arms are not free to assume their natural position but engage the inner corner of the flange while still under tension, the pressure exerted by the fastener tending to draw the cap toward the flange is always present, or is continuously exerted. This will hold the cap from rattling and at the same time provide a snug joint between the hub of the wheel and the edges of the cap around the entire periphery of the latter. Nevertheless if it is desired to remove the cap this may be readily brought about by inserting a tool between the edge of the cap and the flange against which it rests. Since the cap is of an extremely simple construction and since the fasteners themselves are constructed of wire, it will be understood that the construction just described may be provided at a very low cost and may be assembled in an extremely simple and expeditious manner though the arrangement is thoroughly effective in action.

In the form of the invention illustrated in Figures 5, 6 and 7 of the drawings, an alternative way of securing the cap in accordance with the present invention is disclosed. In this form of the invention the flange 12 is made wider than in the form first described and said flange is provided with a plurality of openings 24 for the reception of the shank of a spring fastener presently to be described. As many openings may be provided in said flange as needed to receive the fasteners that secure the cap to the hub. Four such openings are used in the construction illustrated in the drawings. The cap 13 is similar in construction to that above described, though, if desired, the flange 15 may be arranged in spaced relation to the body 14 of the cap but approximately in parallelism thereto. The inwardly turned flange 15 of the cap is provided with preferably hemispherical bosses 25, Figure 7, struck or punched inwardly from said flange toward the body 14, so that the top of the boss is spaced from the body 14 a distance slightly less than the thickness or diameter of the wire from which the fastener, presently to be described, is constructed.

The fastener used in this form of the invention constitutes a head part 26 and a shank part 27 disposed approximately at right angles to the plane of the head part. This fastener, like the fastener above described, is preferably constructed from a single piece of wire by bending the mid portion of the wire into the form of a loop 28, the portions of the wire adjacent the ends of the loop are turned inwardly, preferably, in the plane of the loop, providing short arms 29 and 30 forming a part of the head part of the fastener. Shank part 27 of the fastener is constructed from the ends of the wire which are turned approximately at right angles to the short arms 29 and 30, and are then bowed outwardly between the head and the tips of the wire as indicated at 31 and 32 providing a shank consisting of two legs, the outer portions 33 and 34 of which, adjacent the head of the fastener, diverge whereas the portions 35 and 36 remote from said heads converge. The former portions serve to hold the fastener in engagement with the opening while the latter serve to guide the shank of the fastener into said opening.

The fastener just described is assembled with respect to the cap by entering the head thereof into the space between the flange 15 and the body 14 and causing the loop of the head part to snap past the boss 25, in which position the fastener is interlocked with respect to the cap. If desired the fasteners may be positioned prior to the formation of the boss, and the latter formed by a suitable tool after the loop constituting the head of the fastener is positioned between the flange 15 and the body 14, though the former arrangement is preferred.

After fasteners in the desired number have been interlocked with respect to the cap in the manner just stated the cap is applied to the hub 10 by causing the shank 27 of the fastener to enter the openings 24 in the flange 12 of the hub. Said openings have a diameter smaller than the largest transverse dimension of the shank of the fastener so that the converging portions 35 and 36 of the legs of the fastener first engage the corners of the opening, and when pressure is exerted against the cap in the direction of the axis of said opening, the legs of the fastener are caused to be wedged together, and as the widest portion of the shank of the fastener passes through said opening the legs spring apart so that the divergently disposed holding portions 33 and 34 thereof engage the inner corners of the opening 24. The fasteners are so formed that said legs are under tension after the fasteners have been entered, whereby they exert a wedging action in a corner of the opening tending to draw the head of the fastener and the cap secured thereto firmly toward the flange 12 with a pressure that is continuously effective. In this way the cap is held snugly against the hub.

In the form of invention illustrated in Figures 10, 11 and 12 of the drawings a further form of fastener is disclosed consisting of a head part 37 and a shank part 38, the latter corresponding in construction and mode of operation to the shank part 27 of the fastener illustrated best in Figures 8 and 9 of the drawings.

The head part 37 of this fastener is formed by bending the mid portion of wire from which the fastener is preferably constructed in the form of a U 39, the arms 40 and 41 of which are bent each in the form of a hook including connecting portions 42 and 43 and further arms 44 and 45 arranged in spaced relation to the arms 40 and 41. Arms 41 and 45 and 40 and 44 are spaced apart just sufficiently to snugly grip portion 46 of a flange 47 that is turned inwardly from the edge of the cap 48, preferably formed as illustrated in Figure 10 of the drawings. If desired, in this form of the invention the arms 41 and 45 and 40 and 44 may be arranged so that the spacing thereof is slightly less than the thickness of the flange of the metal to which they are applied so that said flange is firmly gripped between said arms when the fasteners are hooked thereon. If this arrangement is used, the formation of inwardly projecting bosses similar to the bosses 25 above described with reference to Figures 5, 6 and 7 may be dispensed with, though such bosses may be used if desired.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In combination, a metallic wheel hub formed to provide an axial opening surrounded by a flange having a plurality of spaced perforations, a cap lapping said flange and perforations, and a plurality of separate spring fasteners securing said cap to said hub, each fastener having a head part removably secured to said cap so as to be concealed thereby, and a shank part snapped in one of said perforations.

2. The combination defined in claim 1 in which said cap is provided with a flange turned inwardly from the edges thereof and having a plurality of bosses, and in which said fasteners are interlocked to said cap by springing them past said bosses between said cap flange and the body thereof.

3. A hub cap and fastener assembly consisting of a cap body having portions thereof turned under beneath said body so as to be concealed thereby, and a plurality of separate wire spring fasteners, each fastener having a part removably hooked on one of said portions, and a pair of arms acting each in opposition to the other and projecting away from said body and presenting a pair of inclined shoulders for engagement with said hub so that each fastener in applied position of the cap exerts a yielding pull on the cap drawing it toward the hub.

4. A hub cap and fastener assembly consisting of a cap body having peripheral portions turned under to provide a flange beneath said body, and a plurality of separate wire spring fasteners, each fastener having a head part removably hooked upon said flange and a holding part consisting of a pair of crossed spring arms each of which is bent to provide an inclined shoulder designed to engage a hub so as to exert a yielding pull on the cap drawing it toward the hub.

5. A hub cap ready for attachment to the metallic hub of a wheel, consisting of a sheet metal body having its peripheral portion turned inwardly beneath and in spaced relation to said body providing a flange, and a plurality of spring fasteners separately removably hooked on said flange, each fastener having a pair of crossed spring arms providing inclined holding shoulders designed to engage a hub so as to exert a yielding pull on the cap drawing it toward the hub.

BION C. PLACE.